United States Patent [19]

Struthers

[11] Patent Number: 4,528,250
[45] Date of Patent: Jul. 9, 1985

[54] FUEL CELL CATHOLYTE REGENERATING APPARATUS

[76] Inventor: Ralph C. Struthers, 39503 Calle El Fuente, Saugus, Calif. 91350

[21] Appl. No.: 533,363

[22] Filed: Sep. 19, 1983

[51] Int. Cl.³ .............................................. H01M 8/06
[52] U.S. Cl. .................................. 429/19; 429/34; 204/237
[58] Field of Search .................. 429/19, 34, 39, 14, 429/17, 38, 46, 39; 204/237, 269, 270, 275, 277, 278; 210/679, 805, 180, 182, 181, 259, 294

[56] References Cited

U.S. PATENT DOCUMENTS

| | | | |
|---|---|---|---|
| 3,300,341 | 1/1967 | Gregory et al. | 429/34 X |
| 4,317,863 | 3/1982 | Struthers | 429/19 |
| 4,344,849 | 8/1982 | Grasso et al. | 429/17 X |
| 4,344,850 | 8/1982 | Grasso | 429/17 X |
| 4,352,864 | 10/1982 | Struthers | 429/14 X |

Primary Examiner—Anthony Skapars
Attorney, Agent, or Firm—Georges A. Maxwell

[57] ABSTRACT

A catholyte regenerating apparatus for a fuel cell having a cathode section containing a catholyte solution and wherein fuel cell reaction reduces the catholyte to gas and water. The apparatus includes means to conduct partially reduced water diluted catholyte from the fuel cell and means to conduct the gas from the fuel cell to a mixing means. An absorption tower containing a volume of gas absorbing liquid solvent receives the mixed together gas and diluted catholyte from the mixing means within the absorption column, the gas is absorbed by the solvent and the gas ladened solvent and diluted catholyte are commingled. A liquid transfer means conducts gas ladened commingled solvent and electrolyte from the absorption column to an air supply means wherein air is added and commingled therewith and a stoichiometric volume of oxygen from the air is absorbed thereby. A second liquid transfer means conducts the gas ladened commingled solvent and diluted catholyte into a catalyst column wherein the oxygen and gas react to reconstitute the catholyte from which the gas was generated and wherein the reconstituted diluted catholyte is separated from the solvent. Recirculating means conducts the solvent from the catalyst column back into the absorption column and liquid conducting means conducts the reconstituted catholyte to a holding tank preparatory for recirculation through the cathode section of the fuel cell.

11 Claims, 2 Drawing Figures

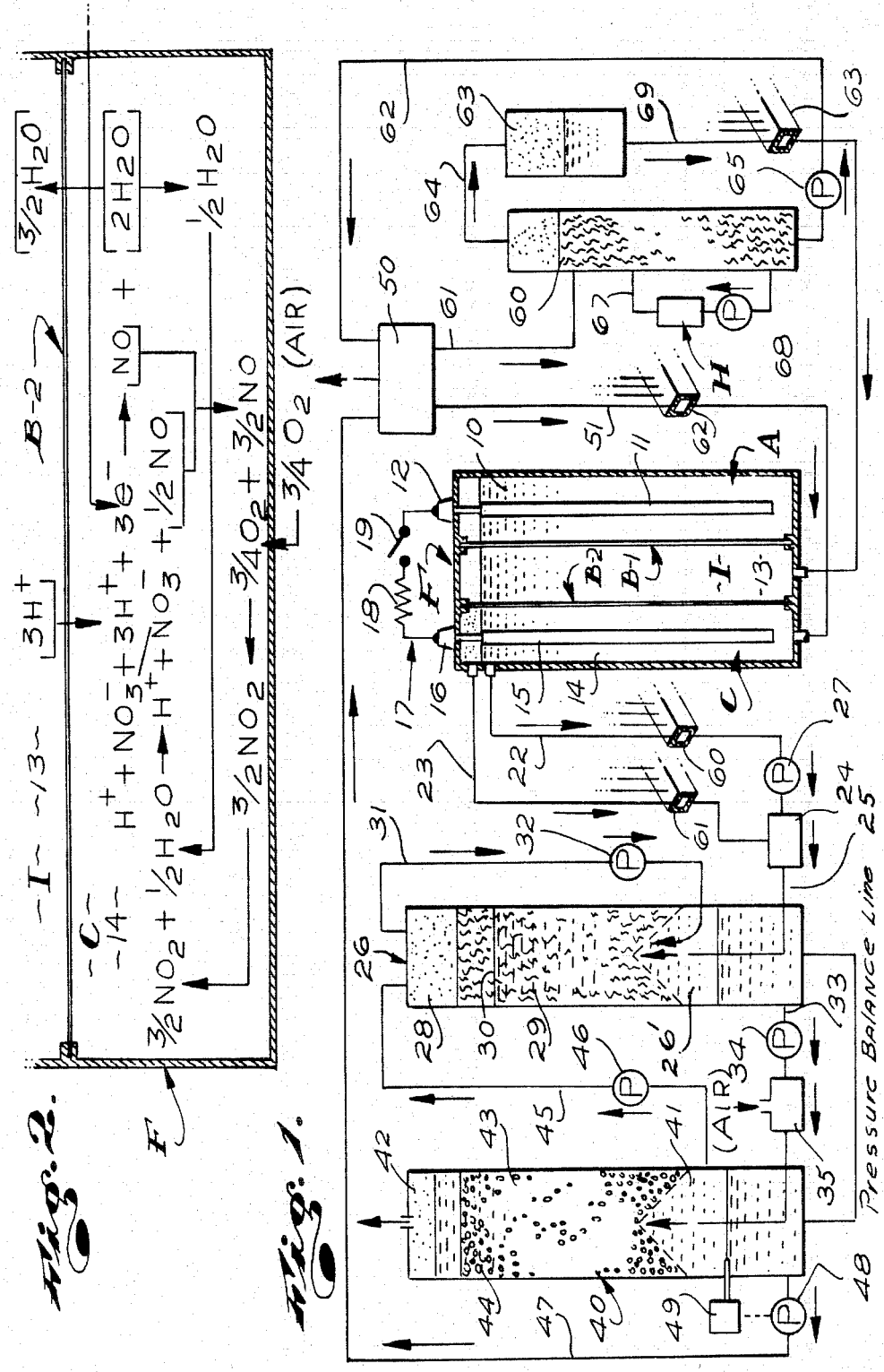

FUEL CELL CATHOLYTE REGENERATING APPARATUS

This invention has to do with a novel fuel cell catholyte regenerating apparatus.

BACKGROUND OF THE INVENTION

In the art of fuel cells, there are a number of different forms of fuel cells which include adjacent anode and cathode sections separated by ion exchange membranes or barriers and which are filled with or contain volumes of anolyte and catholyte (electrolyte solutions) and in which anode and cathode plates are immersed. Still other fuel cells, of a somewhat similar nature, include ion exchange sections between and separated from the anode and cathode sections, by ion exchange barriers or membranes and which are filled with ionolyte solutions.

Effective and efficient operation of fuel cells of the general character referred to above is greatly dependent upon maintaining the electrolytes, that is, the anolytes and catholytes or the anolytes, ionolytes and catholytes in proper chemical balance. The normal fuel cell reaction in the fuel cells of the character referred to above works to adversely alter the chemical balance of the electrolytes and requires that the electrolytes be constantly monitored and regularly replaced with new or fresh electrolytes in order to maintain effective and efficient fuel cell operation.

To maintain the electrolytes in fuel cells in a properly balance condition by replacing the old or spent electrolytes with new or fresh electrolytes require that large and heavy supplies of new or fresh electrolytes be provided and maintained and requires complicated and inconvenient to operate means for effecting a replacement of spent electrolytes with fresh or new electrolytes in the fuel cells. Means must also be provided to receive and/or to effect disposal of the replaced or spent electrolytes. The whole of the apparatus or means required to effect handling new and old electrolytes in the course of operating fuel cells generally occupies more space, is heavier and can be more costly than the fuel cells served thereby. Further, the electrolytes are or can be costly to establish solutions and are such that the practice of replacing partially spent electrolytes with fresh electrolytes and directing the spent electrolytes to waste cannot be considered desirable and is certainly not a cost effective practice.

It is apparent that many prior art fuel cells have been determined to be wanting and unsuitable for practical use because they require large, heavy, costly and inconvenient to maintain and operate electrolyte supply means and/or systems, not because the fuel cells themselves are inherently wanting.

In accordance with the foregoing, there is a recognized want and need for electrolyte supply means and/or apparatus for fuel cells of the general character referred to in the preceding which eliminate the need to provide and maintain large volumes of fresh electrolytes, eliminate uneconomical waste of electrolytes and which are easy and economical to make and maintain, whereby sustained operation of such fuel cells can be made functionally and economically practical. More particularly, there is a want and need for an effecive and efficient means or apparatus for regenerating cathode electrolytes or catholytes for that class of fuel cells having cathode sections which are structurally separated from related anode sections or related ion exchange sections, whereby such fuel cells can be operated continuously and uninterruptedly on and with a small supply of catholyte.

OBJECTS AND FEATURES OF MY INVENTION

It is an object of my invention to provide a novel apparatus for maintaining the supply of catholyte in a fuel cell or in a battery of fuel cells, in balanced condition throughout protracted and sustained periods of fuel cell operation.

It is an object and a feature of my invention to provide an apparatus for the purpose set forth above related to or in combination with the cathode section or sections of one or a battery of fuel cells which apparatus receives spent or weakened and diluted catholyte, works upon the spent catholyte to rejuvenate it and to bring it back to full strength and which returns the regenerated catholyte back into the fuel cell cathode section or sections served thereby.

It is an object and feature of my invention to provide a means or apparatus of the general character referred to above which is easy and economical to make and maintain, which is easy, effective and dependable in operation, and which is sufficiently small and light so that its use, in combination with a related battery of fuel cells, is highly effective and practical in the great majority of those situations where the battery of fuel cells might be used.

The foregoing and other objects and features of my invention will be made apparent and fully understood from the following detailed description of my invention, throughout which description reference is made to the accompanying drawings.

DESCRIPTION OF THE DRAWINGS

FIG. 1 is a diagrammatic view of my new apparatus shown connected to and in combination with a fuel cell;

FIG. 2 sets forth the cathode fuel cell reaction formula in the preferred embodiment of my invention.

DESCRIPTION OF THE INVENTION

The fuel cell catholyte regenerating apparatus that I provide is intended to be related to and to serve a multiplicity of like fuel cells which are related to establish a battery of fuel cells. For the purpose of this disclosure and so an not to unduly complicate the drawings and possibly cloud the invention, I have elected to illustrate and will describe the apparatus related to a single fuel cell F. It is to be understood that the fuel cell F is but one of a multiplicty of like fuel cells in a related battery of fuel cells served by my apparatus.

The fuel cell F can vary considerably in form and details of construction and is diagrammatically shown as including an anode section A, a central or intermediate ion exchange section I and a cathode section C. The anode section A is filled with or contains a suitable volume of anolyte (electrolyte) 10, an anode plate 11 immersed in the anolyte and an anode terminal 12 related to the plate 11 and accessible at the exterior of the cell structure. The intermediate ion exchange section I is filled with or contains a suitable volume of ionolyte (electrolyte) 13 which is separated from the anolyte 10 by an ion exchange barrier or membrane B-1. The catholyte section C is filled with or contains a suitable volume of catholyte (electrolyte) 14 which is separated from the ionolyte 13 by an ion exchange barrier or membrane B-2. The section C further includes an electron distributor or cathode plate 15 immersed in the catholyte 13 and a cathode terminal 16 related to the plate 15 and accessible at the exterior of the cell.

The terminals 12 and 16 are connected with an electric circuit 17 served by the fuel cell F. The circuit 17 allows or provides for the flow of free electrons from the anode section A to the cathode section C. The circuit 17 is shown as including a resistance 18 which represents a work load served by the cell F and as including an on and off switch 19.

In practice, the anode plate 11 can be established of various or different materials and/or elements which are suitable and effective anode fuels. For example, and for the purpose of this disclosure, the anode plate 11 is aluminum. The anolyte 10 in the section A is an aqueous alkaline or base solution of, for example, sodium hydroxide.

The ionolyte 13 in the intermediate or central ion exchange section I can be an aqueous alkaline solution similar to the anolyte 10.

The catholyte 13, like the ionolyte, is an aqueous nitric solution. The cathode plate 15 is a chemically inert electron distributor element or part and is preferably established of particular carbon or the like having great surface area.

When the switch 19 of the electric circuit 17 is closed, electrons flow from the anode section A to the cathode section C and fuel cell reaction is commenced. Fuel cell reaction generates free electrons or electric current at the anode section A. The current flows through the circuit 17 to perform suitable work at the resistance 18 and directs free electrons into the cathode section C.

Upon the addition of free electrons (3 e−) to the nitric acid catholyte 14 and commencement of fuel cell reaction, hydrogen ions (3 H+) move from the ion exchange section 13 through the ion exchange membrane B-2 and combine with the catholyte. The resulting chemical reaction in the cathode section reduces the nitric acid ($HNO_3$) to nitrogen oxide gases (NO and $NO_2$) and produces water (2 $H_2O$). The generating of nitrogen oxide gases results in the depletion of acid in the catholyte and the water generated by fuel cell reaction dilutes the acid catholyte. Accordingly, reduction and loss of acid and the addition of water combined to rapidly weaken and dilute the catholyte to a degree that it will not support effective and efficient fuel cell reaction. When the catholyte is so weakened and/or diluted, it is said to be "spent".

In common practice, when the catholyte in a fuel cell or in a battery of fuel cells is spent, the spent catholyte is drained from the cell or cells and directed to waste. The spent and wasted catholyte is replaced with new or fresh catholyte from an available supply of new or fresh catholyte.

The fuel cell catholyte regenerating apparatus that I provide is intended and operates to receive spent catholyte 14 and the nitrogen oxide gases from the cathode section C of the fuel cell F and works upon the spent catholyte and gases to regenerate or return the materials worked upon to their original state, that is, to new or fresh catholyte. The apparatus further works to return the new or regenerated catholyte back into the fuel cell F, thus maintaining the catholyte in the fuel cell in desired strength or chemical balance at all times. Thus, the apparatus serves to eliminate the need to commit spent catholyte to waste and the need to continuously replace spent catholyte with new catholyte from an independent supply of fresh catholyte.

The apparatus that I provide includes a liquid or outlet port 20 in the fuel cell structure and communicating with the cathode section C and a gas outlet port 21 in the fuel cell structure communicating with the section C. Liquid and gas conducting lines 22 and 23 connect with the ports 20 and 21 and extend to and connect with liquid and gas inlets of a mixing unit 24. The mixing unit 24 has an outlet which is connected with a delivery line 25 extending to an absorption column 26.

A pump 27 is engaged in the line 22 to move liquid catholyte from the cell section C and to deliver into and through the mixing unit 24 at substantial velocity. The mixing unit 24 is an aspirator unit and is such that the liquid catholyte directed through it draws the gases from the cell section C through line 23 and commingles or mixes the gases with the catholyte within the flowing from the unit 24. The commingled or mixed catholyte and gases flowing from the mixing unit 24 are conducted through the lines 25 and discharge into the absorption column 26. The absorption column 26 is an elongate vertical tank-like unit with a lower chamber 27 having an upper receiving portion and a lower catch basin portion, an upper gas accumulating chamber 28, and an intermediate or central absorption chamber 29. The absorption chamber is filled with a suitable high wetted surface area packing 30. In practice, the nature and form of the packing 30 can vary widely. In the preferred carrying out of my invention, the packing 30 is established of thin, flat metal ribbons formed with a plurality of very small burred perforations. The packing 30 is contained in the chamber 29 and the interfaces between the adjacent chambers in the column are defined by suitable metal fabric screens or the like.

In addition to the foregoing, the absorption column 26 includes, contains or is provided with a volume of solvent S which occurs in and wets the surface of the packing 30. In one preferred carrying out of my invention, the solvent S is a solution of 20–50% tributyl phosphate and 80–50% kerosene. While other materials can be used to establish solvents S which are the full equivalents of the noted kerosene base solvent, the noted solvent is economical and easy to make.

The solvent S is introduced into the top of the column 26 above the packing 30 and flows down through the packing 30 to collect in the catch basin portion of the lower chamber 26', as will be made apparent in the following.

The commingled or mixed gases and spent catholyte flowing from the mixing unit 24 through line 25 and into the column 26 is discharged in the column 26 at the bottom or lower end of the packing 30 and is preferably directed upwardly into and through the packing. The gases and catholyte flowing up into and through the packing 30 counter the gravity induced downwardly flow of the solvent S therein. The solvent absorbs the gases and the gas ladened solvent, commingled with the catholyte, drops down into the catch basin portion of the lower chamber 26' in the column.

To assure complete absorption of all of the gases, a recirculating line 31 is connected with and between the upper and lower chambers 26' and 28 of the column 26 and a pump 32 is engaged in the line 31 to move gases rising and collecting in the chamber 28, at the top of the column, down and into the chamber 26' at the bottom of the column, for recirculation up into and through the packing 30.

The solvent S, with absorbed gases and the spent catholyte collected in the lower catch basin portion of the lower chamber 27 of the column 26 is conducted from the column 26 through a transfer line 33 and is commingled and mixed with air and thence delivered into the lower end of an elongate vertical tank-like catalyst column 40.

The transfer line 33 has a pump 34 engaged therein to move the materials from the column 26 to the column 40 and has an aspirator 35 engaged therein, downstream of the pump 34. The aspirator 35 has an air inlet and operates to draw air, which contains necessary oxygen ($O_2$) from the atmosphere and commingles the air or oxygen with the liquids flowing into the column 40. The commingled oxygen is, at least in part, absorbed by the solvent whereby the nitric oxide gases absorbed by the solvent and the oxygen are brought into intimate contact with each other and the nitric oxide gases are suitably oxidized by the oxygen. The aspirator 35 is adjustable and/or set so that the oxygen ($O_2$) from the air is added to the solution flowing through the aspirator in stoichiometric proportions for effective oxidation of the solvent absorbed nitric oxide gases.

The catalyst column 40 has a lower collector and separator chamber 41, an upper accumulator chamber 42, and a central or intermediate catalyst chamber 43.

The catalyst chamber 43 is filled with a suitable catalyst packing 44. The packing 44 in chamber 43 can, for example, be a hydrogen form cation exchange resin produced from a cross-linked styrene divinylbenzene polymer or can, for example, be established by a volume of alumina pellets coated with appropriate elements such as palladium, platinum, rhodium, or ruthenium. It might also be established of a suitable metal in perforated ribbon form, similar to the packing 30 in column 26. The foregoing example of catalyst packings are but examples of packing materials that might be advantageously employed.

The packing 43 is contained and the interface between the chambers 41, 42 and 43 are defined by screens or the like.

The line 33 enters the lower end portion of the column 40 and opens upwardly at the bottom of the packing 44.

The materials conducted through the line 33 and into the lower portion of the column 40 flow up through the packing 44. The absorbed nitric oxide gases are oxidized by the entrained and/or absorbed oxygen within the packing 44 to regenerate or establish nitric acid which recombines with and strengthens the acid content of the spent catholyte within the column 40. Further, the solvent and strengthened or regenerated nitric acid catholyte solution drop down into and collect in the lower chamber 41 to separate therein. That is, the regenerated catholyte and solvent settling in the lower chamber 41 separate by specific gravity displacement. The solvent rises to the top of and occurs above the catholyte and well-defined interface is established therebetween.

The other gases from the air which are introduced into the materials worked upon by the aspirator 35 and which are discharged into the column 40 separate and rise to the upper accumulator chamber 42 of the column 40 from which they are suitably vented to atmosphere.

The separated solvent S in the column 40 is conducted from the column 40 and delivered into the top of column 26 for recirculation through the packing 30 therein by means of a return line 45 connected with and between the lower portion of the column 40 and the upper portion of the column 26 and in which a pump 46 is engaged to move the solvent (substantially as shown).

The separated regenerated or fresh catholyte collected at the bottom of the chamber 41 of column 40 is conducted from the column 40 to a holding tank 50 by a flow line 47 in which a suitable pump 48 is engaged to move the liquid. The pump 48 is preferably under control of a resistance type liquid level sensing device 49 which operates to close a power supply to the pump 48 when the level of the catholyte collected at the bottom of the column 40 is of a predetermined low level. The device 49 serves to maintain the supply of catholyte suitably distributed throughout the system or apparatus at all times.

The catholyte in the holding tank 50 is gravity fed back into the cathode section C of the fuel cell F by a delivery line 51 extending from the tank through an inlet port in the fuel cell structure.

The regenerated or reconstituted catholyte delivered into the holding tank 50 from the column 40 is still diluted by the water ($H_2O$) product of cathode reaction. To remove excess water from the catholyte in the holding tank 50, I provide a distillation column 60 for reconcentrating the catholyte by fractional distillation. The column 60 is a conventional plate or packed type distillation column with a liquid inlet connected with the tank 50 by a line 61, a liquid outlet connected with the tank 50 by a line 62, and a vapor outlet connected with a condensor 63 by a line 64. A pump 65 is engaged in the line 62 to move liquid from the column 60 through line 62 back into the tank 50.

In the case illustrated, a liquid heater unit H is engaged in a recirculation line 67 with upper and lower inlet and outlet ends communicating with the column 60 and a pump 68 engaged in the line 67 to move and recirculate the catholyte in the column 60 through the heater unit H. The water vapor flowing from the column 60 into the condensor 63 condenses therein and is thereafter conducted through line 69 into the ion exchange section I of the fuel cell F to maintain the supply of ionolyte therein at desired level and to maintain it suitably diluted.

The fractional distillation process if preferably carried on slowly and continuously. The catholyte in the holding tank 50 is continuously recirculated through the column 60 and is reconcentrated at approximately the same mean rate that reconstituted catholyte is conducted from the tank 50 into the fuel cell F.

In practice, the diluted reconstituted catholyte flowing from the catalyst column 40 can be conducted directly to the distillation column 60 rather than to the tank 50, without departing from the broader aspects and spirit of my invention.

With the apparatus described above and shown in FIG. 1 of the drawings, and with the catholyte in the cathode section of the fuel cell being an aqueous solution of nitric acid (HNO) to which three free electrons (3 $e^-$) from the anode section A of the fuel cell and three hydrogen ions (3 $H+$) from the ion exchange section I of the fuel cell are added, the chemical reaction at the cathode section C of the cell F, that is, the cathode reaction is that reaction which is set forth in the formula in FIG. 2 of the drawings.

In practice, when the materials employed to establish the anode plate and the various electrolytes of the fuel cell F are changed, the cathode chemical reaction, while similar to the reaction shown in FIG. 2 of the drawings, will change. Accordingly, the cathode chemical reaction set forth in claim 2 of the drawings is but an example of the cathode reaction which is encountered in connection with and in carrying out of my invention and is set forth to provide a better understanding of the nature and function of my new apparatus.

In the drawings, the lines 22, 23, 51 and 69 are shown as having manifolds 60, 61, 62 and 63 engaged therein. The manifolds serve to connect the apparatus with a plurality of like fuel cells which make up a battery of fuel cells served by the apparatus.

Further, in practice, the lines 22, 23, 51 and 69 are preferably established of dielectric plastic tubing and are sufficiently small in diameter and sufficiently long so that the electric resistance of the columns of liquid and gas therein is sufficiently great to prevent the flow of shunt currents therethrough which might adversely affect operation of the battery of cells. The foregoing method and/or means for electrically isolating the cells from the apparatus is but one of a number of means that can be advantageously used. The means shown is preferred since it is quite inexpensive, simple and has proven to be highly effective.

Having described one preferred form and carrying out of my invention, I do not wish to be limited to the specific details herein set forth but wish to reserve to myself any modifications and variations that might appear to those skilled in the art and which fall within the scope of the following claims:

Having described my invention, I claim:

1. A catholyte regenerating apparatus in combination with a fuel cell having a cathode section containing a catholyte solution and wherein fuel cell reaction reduces the catholyte to gas and water, said apparatus includes liquid conducting means conducting partially reduced water diluted catholyte from the fuel cell, gas conducting means conducting the gas from the fuel cell, mixing means connected with the liquid and gas conducting means and receiving the diluted catholyte and gas conducted thereby, an absorption tower containing a volume of gas absorbing liquid solvent, delivery means conducting the mixed together gas and diluted catholyte from the mixing means into the absorption column wherein the gas is absorbed by the solvent and the gas ladened solvent and diluted catholyte are commingled, air supply means, a liquid transfer means conducting gas ladened commingled solvent and electrolyte from the absorption column to the air supply means wherein air is added and commingled therewith and a stoichiometric volume of oxygen is absorbed thereby, a catalyst column containing a packing of catalyst, a second liquid transfer means conducting the gas ladened commingled solvent and diluted catholyte into the catalyst column wherein the oxygen and gas react to reconstitute the catholyte from which the gas was generated and wherein the reconstituted diluted catholyte is separated from the solvent, recirculated means conducting the solvent from the catalyst column into the absorption column, a holding tank, a line conducting the diluted catholyte with reconstituted catholyte added from the catalyst column to the holding tank and catholyte return means conducting catholyte from the holding tank to the cathode section of the fuel cell.

2. The combination set forth in claim 1 wherein the catholyte is nitric acid.

3. The combination set forth in claim 2 wherein the solvent is 20–50% tributylphosphate and 80–50% kerosene.

4. The combination set forth in claim 1 wherein the apparatus further includes a distillation unit to remove water from and to concentrate the catholyte in the holding tank, liquid circulating and conducting means conducting liquid from the holding tank through the distillation unit and back into the holding tank.

5. The combination set forth in claim 1 wherein the fuel cell has an ion exchange section containing an aqueous ionolyte solution separated from the catholyte in the cathode section by an ion exchange membrane and wherein water of the ionolyte is given up to the catholyte by fuel cell reaction, said apparatus further includes a water condenser, means conducting water vapor from the distillation unit to the condenser and means conducting water from the condenser to the ionolyte in the ion exchange section of the fuel cell.

6. The combination set forth in claim 1 wherein the fuel cell has an ion exchange section containing an aqeous ionolyte solution separated from the catholyte in the cathode section by an ion exchange membrane and wherein water of the ionolyte is given up to the catholyte by fuel cell reaction, said apparatus further includes a water condenser, means conducting water vapor from the distillation unit to the condenser and means conducting water from the condenser to the ionolyte in the ion exchange section of the fuel cell, a distillation unit to remove water from and to concentrate the catholyte in the holding tank, liquid circulating and conducting means conducting liquid from the holding tank through the distillation unit and back into the holding tank.

7. The combination set forth in claim 1 wherein the liquid and gas conducting means and catholyte return means include manifolds with inlets and outlets connecting the mixing means and the holding tank with a plurality of fuel cells in a battery of fuel cells served by the apparatus.

8. The combination set forth in claim 1 wherein the liquid and gas conducting means and catholyte return means include manifolds with inlets and outlets connecting the mixing means and the holding tank with a plurality of fuel cells in a battery of fuel cells served by the apparatus, a distillation unit to remove water from and to concentrate the catholyte in the holding tank, liquid circulating and conducting means conducting liquid from the holding tank through the distillation unit and back into the holding tank.

9. The combination set forth in claim 1 wherein the liquid and gas conducting means and catholyte return means include manifolds with inlets and outlet connecting the mixing means and the holding tank with a plurality of fuel cells in a battey of fuel cells served by the apparatus, an ion exchange section containing an aqueous ionolyte solution separated from the catholyte in the cathode section by an ion exchange membrane and wherein water of the ionolyte is given up to the catholyte by fuel cell reaction, said apparatus further includes a water condenser, means conducting water vapor from the distillation unit to the condenser and means conducting water from the condenser to the ionolyte in the ion exchange section of the fuel cell.

10. The combination set forth in claim 1 wherein the liquid and gas conducting means and catholyte return means include manifolds with inlets and outlets connecting the mixing means and the holding tank with a plurality of fuel cells in a battery of fuel cells served by the apparatus, a distillation unit to remove water from and to concentrate the catholyte in the holding tank, liquid circulating and conducting means conducting liquid from the holding tank through the distillation unit and back into the holding tank, an ion exchange section containing an aqueous ionolyte solution separated from the catholyte in the cathode section by an ion exchange membrane and wherein water of the ionolyte is given up to the catholyte by fuel cell reaction, said apparatus further includes a water condenser, means conducting water vapor from the distillation unit to the condenser and means conducting water from the condenser to the ionolyte in the ion exchange section of the fuel cell.

11. The combination set forth in claims 4, 5, 6, 7, 8, 9 or 10 wherein the catholyte is an aqueous solution of nitric acid and wherein the solvent is 20-50% tributylphosphate and 80-50% kerosene.

* * * * *